June 9, 1931.  E. J. P. PLANERT  1,808,935

HUMIDIFIER

Filed Aug. 13, 1928   2 Sheets-Sheet 1

Inventor:
Emil J. P. Planert,
By Bunning & Bunning
Attorneys.

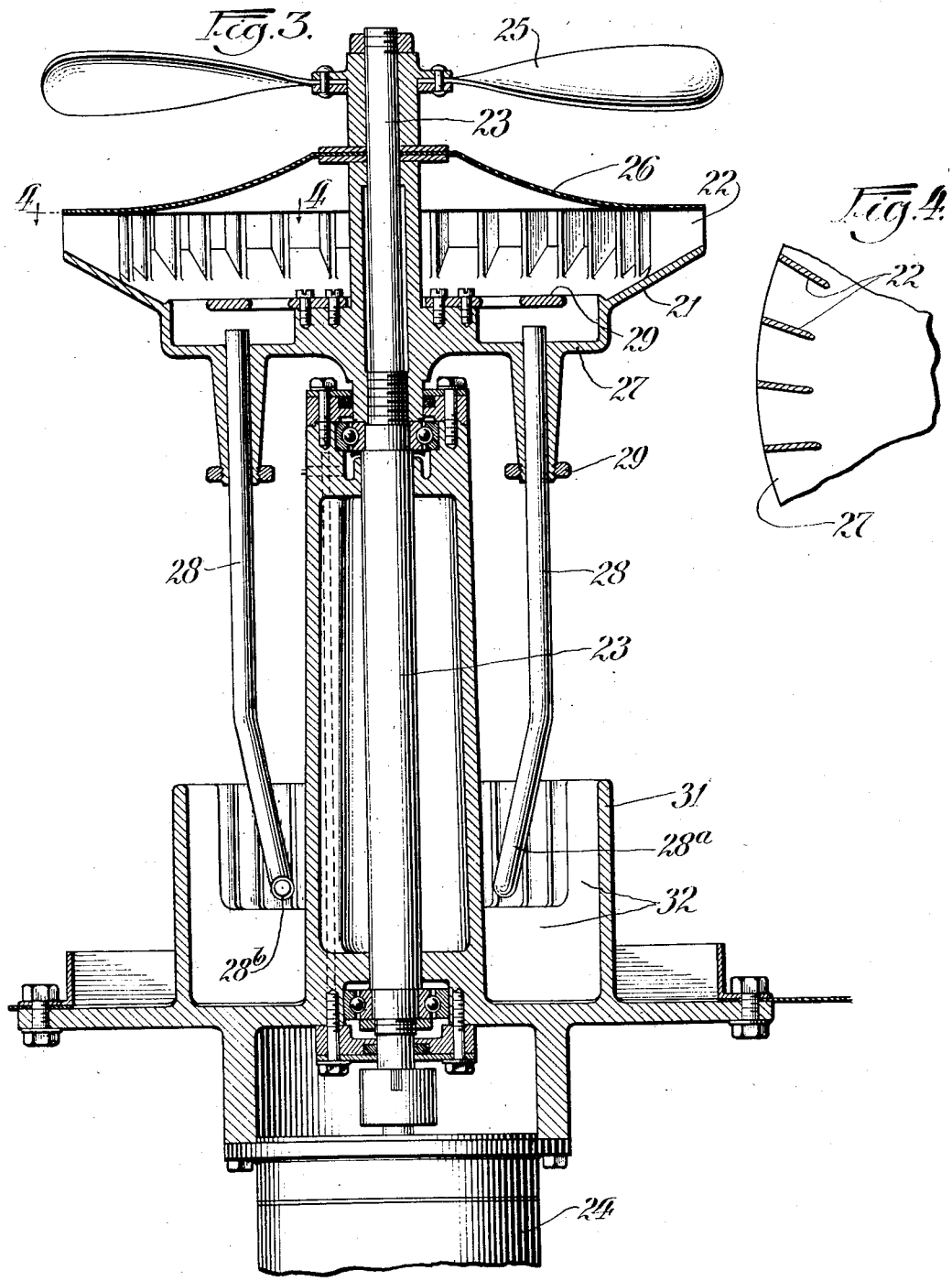

Patented June 9, 1931

1,808,935

UNITED STATES PATENT OFFICE

EMIL J. P. PLANERT, OF UNION CITY, NEW JERSEY

HUMIDIFIER

Application filed August 13, 1928. Serial No. 299,213.

This invention relates to humidifiers and to certain details of improvement therein whereby a desired mixture of air and water vapor may be obtained more evenly and economically than with the apparatus heretofore devised.

The invention is fully described in the following specification and shown in the accompanying drawings, in which Figure 1 is a top plan view of a humidifier embodying the invention, the same showing parts cut away so as to disclose various portions of the apparatus;

Fig. 3 is a partial enlarged section on the line 3—3 of Fig. 1; and

Fig. 4 is a partial section on the line 4—4 of Fig. 3.

Figure 1:
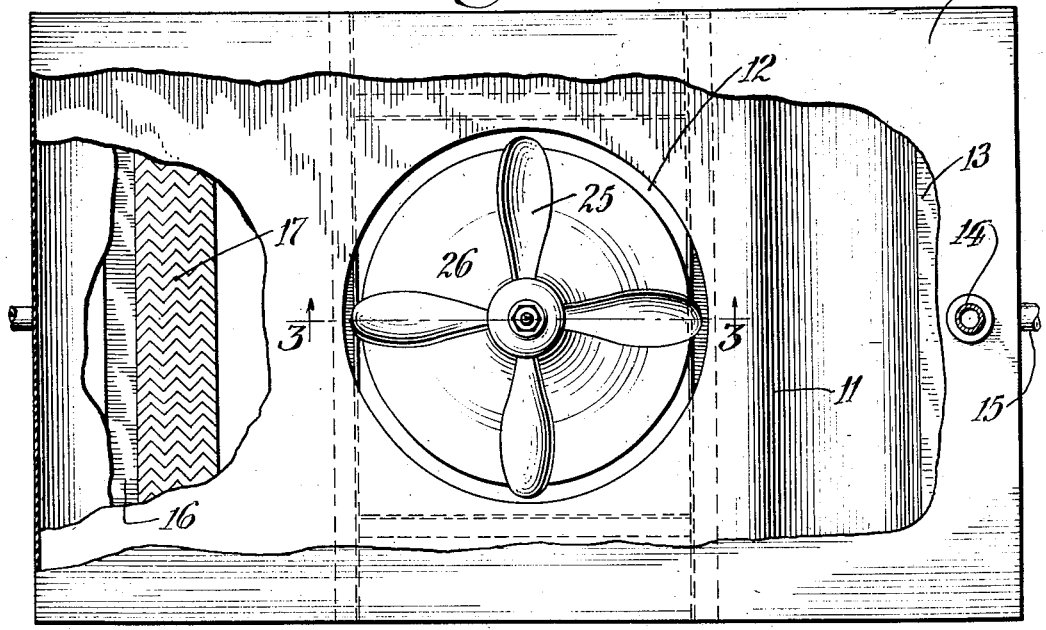
Figure 2:
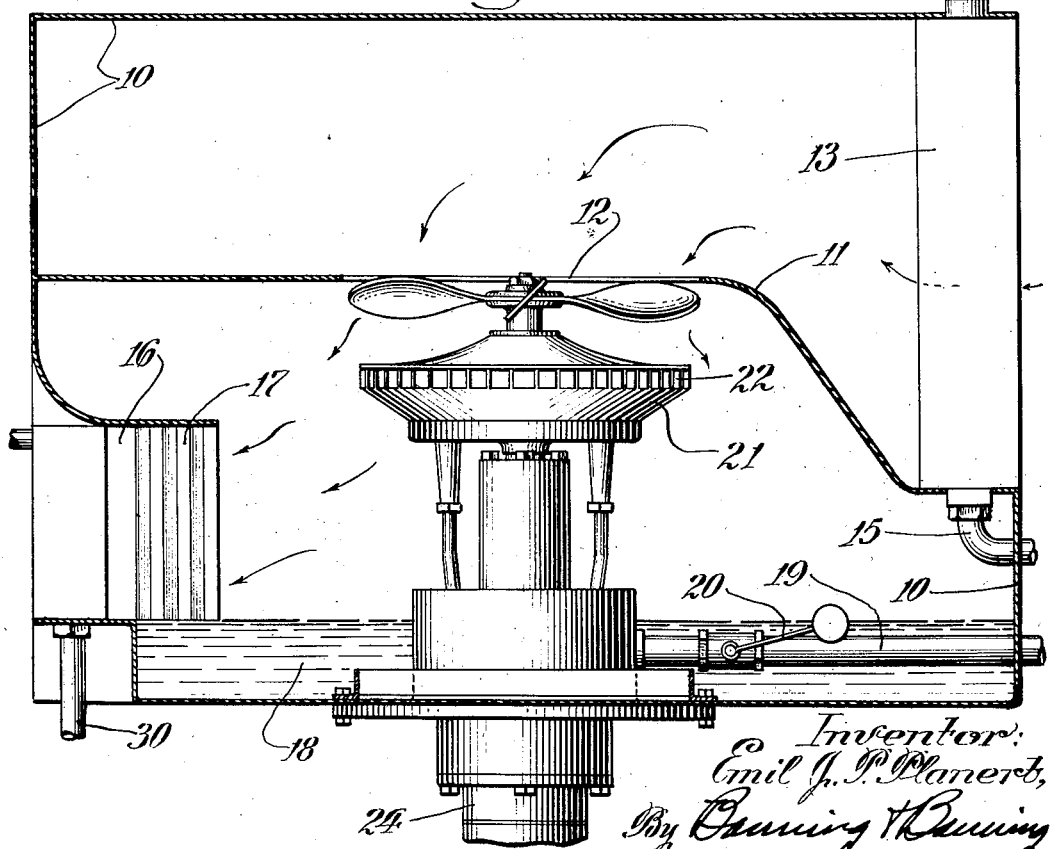
Fig. 2 is a vertical longitudinal section of the same.

The embodiment illustrated comprises a housing 10 preferably of sheet metal, or the like, which is adapted to be supported in any desired manner (not shown), such as by means of legs by which it may be stood on the floor, or by means of suitable supports by which the same may be suspended from the ceiling. The housing is divided by means of a central partition 11 having an opening 12 therein through which air may pass, as will later be described. Air enters the apparatus through a front 13 which is preferably heated as by means of steam passing through the pipes 14 and 15. The air passes down through an opening 12 and out through an outlet passage 16 which is preferably provided with a series of metal louvres 17 or the like for catching unvaporized particles of water.

The bottom of the housing 10 is adapted to receive and hold a body of water 18, this water being supplied thereto through a water supply pipe 19, the height of water within the housing being regulated by means of a suitable float valve 20.

A humidifier device represented generally by 21 lies beneath the opening 12 in the partition 11 and consists essentially of a hollow member having a series of radial vanes 22 to which water is fed, as will later be described, the vanes 22 being carried upon a vertical shaft 23 which is driven by a suitable electric motor 24 or the like. The shaft also carries a fan 25. The upper portion of the humidifier 21 is covered preferably by means of a sheet metal plate 26 which is preferably dished, as shown in Fig. 3, so that air driven down by the fan 25 will spread out over the humidifier in all directions.

Water is supplied to the vanes 22 in the following manner: A plurality of depending tubes 28 are secured therein by means of nuts 29. These tubes are preferably straight in their upper portions and parallel to the shaft 23, the lower portion 28$^a$ being curved inwardly and terminating in right angle bends 28$^b$ which are bent forwardly so as to serve to scoop up water from the reservoir 18 into which they dip.

The water will thus be forced to rise in the pipes 28, this action being increased by the centrifugal action of the water within the outwardly extending portions 28$^a$. These pipes terminate below the level of the vanes 22 and have a plate 29 or the like overlying the tops of the tubes, so that as the shaft 23 is revolved in a counter-clockwise direction, as shown in Fig. 1, water will be driven up through the tubes 28 for reasons heretofore given. The water striking the plate 29 will be sprayed outwardly through the vanes 22 and will be mixed with some of the air within the humidifier and will then pass out readily in all directions from the humidifier. As it does so, it will be brought violently into contact with air driven downwardly by the fan plates 25, and the resulting turbulence will bring the air and water particles in close proximity, so that a high degree of humidification will take place.

In addition to the water thus vaporized, a great deal of unvaporized water in the form of droplets will be entrained and carried along with the air, thus leaving the housing through the openings 16. The tortuous passage 17 forces these water particles against the walls of the passage and causes them to be deposited therein. The water then flows back by gravity to the water reservoir 18. Likewise a greater portion of water employed is thrown out tangentially from the vanes 22, thus striking the sides of the housing and then flowing back to the reservoir 18. An overflow pipe 30 is provided which prevents the water in the reservoir rising above the predetermined level.

To prevent the water within the reservoir 18 from being rotated by means of the tubes 28, I have provided a receptacle 31 having a series of inwardly extending fins or baffles 32 which are cut away, as shown in Fig. 3, to enable the lower portion 28ª of the tubes to pass. These baffles prevent, to a large extent, the rotation of the water with the tubes 28.

Thus it will be seen that I have provided a very simple, compact, and efficient form of humidifier in which the movable parts may be directly driven by an electric motor, and the whole may be readily transported from one place to another and set up and operated with a loss of a minimum amount of time. At the same time the whole is so compact that it occupies but little space.

While I have shown and described but a single embodiment of my invention, it is to be understood that it is capable of many modifications. Changes, therefore, in the construction and arrangement may be made which do not depart from the spirit and scope of the invention as covered by the appended claims.

I claim:

1. In apparatus of the class described, a member having a series of radial vanes and rotatable about a vertical axis, a plurality of tubes adapted to carry liquid secured to said member for rotation therewith and having forwardly projecting portions at their lower ends, a reservoir adapted to hold liquid into which the projections dip, means for maintaining a supply of liquid in said reservoir, means for preventing rotation of the liquid by said lower ends of the tubes, and means for deflecting said liquid toward said vanes.

2. In apparatus of the class described, a member having a series of radial vanes and rotatable about a vertical axis, a plurality of tubes adapted to carry liquid secured to said member for rotation therewith and having forwardly projecting portions at their lower ends, a reservoir adapted to hold liquid into which the projecting portions dip, means for maintaining a supply of liquid in said reservoir, a series of baffles surrounding the space in which the lower ends of said tubes rotate for preventing rotation of the liquid by said lower ends of the tubes, and means for deflecting said liquid toward said vanes.

3. In apparatus of the class described, a member having a series of radial vanes and rotatable about a vertical axis, a plurality of tubes adapted to carry liquid secured to said member for rotation therewith and having lower ends which project in a forward direction into a body of water to force the same through the tubes, said tubes extending upwardly and outwardly to cause the centrifugal action to propel water therethrough, and means for preventing rotation of said body of water by said tubes.

In testimony whereof, I have hereunto set my hand this 8 day of Aug. 1928.

EMIL J. P. PLANERT.